United States Patent [19]
Roth

[11] 4,186,216
[45] Jan. 29, 1980

[54] METHOD FOR DEBONING MEAT

[76] Inventor: Eldon N. Roth, 99 Madera Ct., San Ramon, Calif. 94583

[21] Appl. No.: 896,174

[22] Filed: Apr. 14, 1978

[51] Int. Cl.² .............................................. A22C 17/04
[52] U.S. Cl. ...................... 426/480; 17/1 G; 17/46; 99/567; 426/518; 426/519; 416/524
[58] Field of Search ............... 426/479, 480, 513, 515, 426/518, 519, 524, 281; 17/1 G, 46; 99/537, 567

[56] References Cited

U.S. PATENT DOCUMENTS

| | | | |
|---|---|---|---|
| 2,418,914 | 4/1974 | Tichy | 426/281 X |
| 2,784,446 | 3/1957 | Beatty | 17/46 X |
| 3,089,775 | 5/1963 | Lindall | 17/46 X |
| 3,478,385 | 11/1969 | Kaplan | 17/46 |
| 3,570,050 | 3/1971 | Draper | 17/46 |
| 3,594,190 | 7/1971 | Eslinger et al. | 426/480 X |
| 3,896,522 | 7/1975 | Lapeyre | 17/1 G X |
| 3,904,770 | 9/1975 | Hale et al. | 426/480 X |

Primary Examiner—Anthur L. Corbin
Attorney, Agent, or Firm—Fitch, Even & Tabin

[57] ABSTRACT

A method and apparatus for separating meat from bones particularly after most of the meat has been otherwise removed. Separation of meat from the bones occurs in a cyclical process wherein at least a portion of the separated meat is frozen and formed into small particles which are then recycled and impinged, at relatively high velocities, against meat containing bones to separate the meat from the bones. One embodiment of the apparatus includes mechanical means for exposing various surfaces of the meat containing bones to the frozen impinging meat particles to assure that all of the meat is separated from the bones. In another embodiment, the meat containing bones are supported by an air column which also agitates the meat containing bones and exposes various surfaces thereof to the impinging frozen meat particles.

10 Claims, 4 Drawing Figures

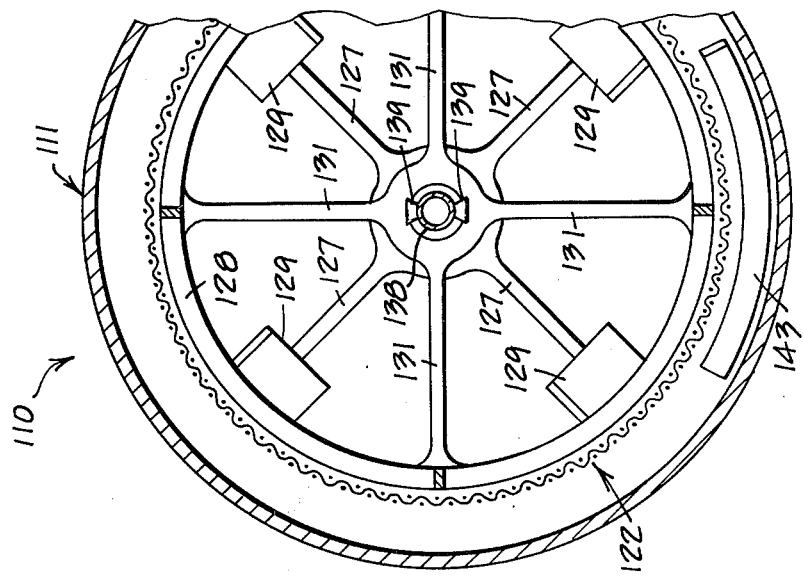
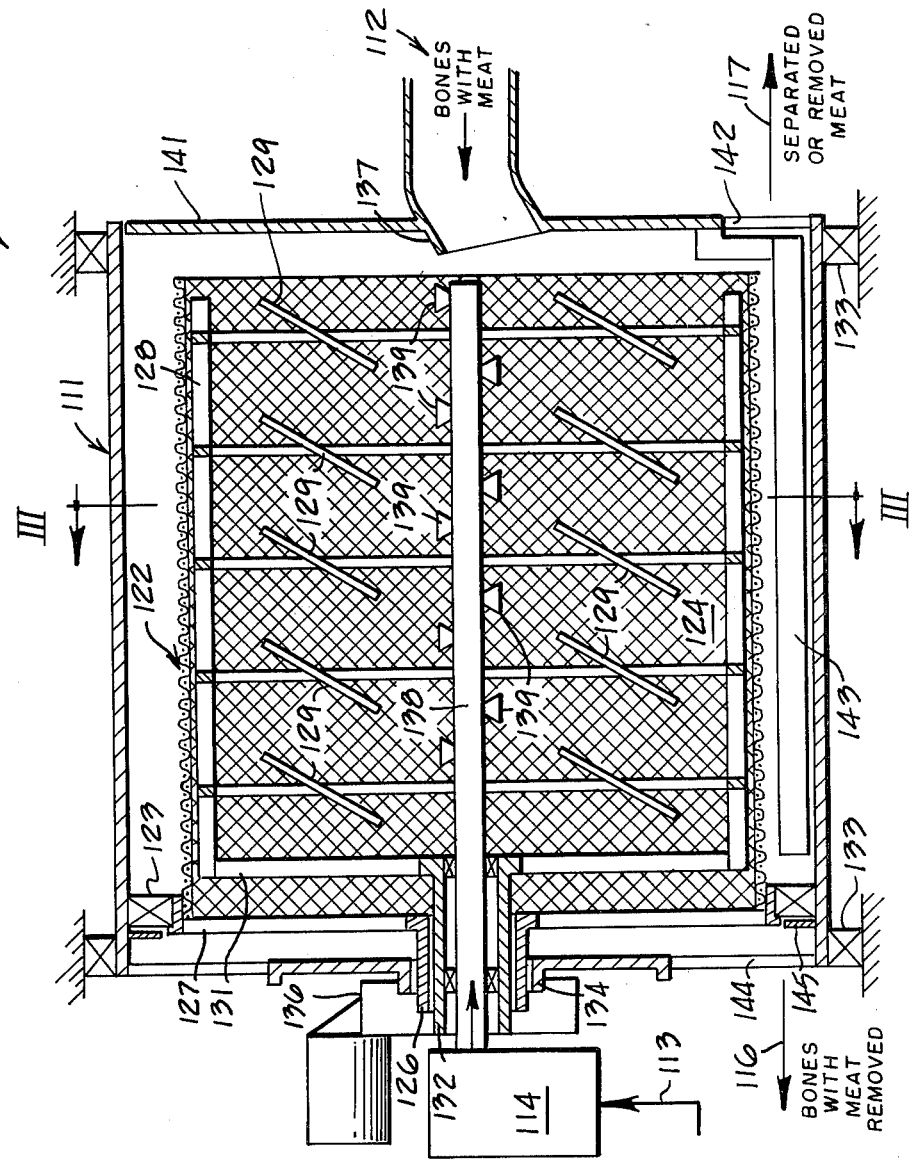

METHOD FOR DEBONING MEAT

BACKGROUND OF THE INVENTION

The present invention relates to a a method and apparatus for removing meat from bones, the method and apparatus contemplating the formation of frozen particles of the meat itself which are impinged at relatively high velocity upon the bone in order to separate or remove the meat.

In the processing of meats of various types including but not limited to beef, pork, mutton, lamb, poultry and fish, it is generally necessary to insure substantially complete removal of meat from the bones in order to achieve maximum utilization of the meat. Most commonly, larger pieces of meat are removed from the bones in a manual process employing a knife. These larger pieces may then be formed into conventional cuts of meat which are sold at relatively higher prices.

In such an operation, it is generally not possible to economically remove all of the meat from the bones. Accordingly, various techniques have been developed and employed to assure generally complete recovery of the meat. In one such technique, after the larger portions of meat have been removed from the bones, the bones and any remaining meat are ground up and cooked so that the meat is of a generally liquid consistency while the bones remain solid. It is then possible to extrude this mixture through a suitable mesh in order to recover the liquid portion comprising meat.

Within such a technique, however, at least a portion of the bone passes through the mesh along with the meat. This presents a problem, at least in the marketing of the recovered meat, since it is generally necessary to label the various components, either meat or bone, in such products. The presence of bone in a meat product may of course be undesirable.

Other techniques have provided means for removal of the remaining meat from the bones without the need for grinding up both the bone and the meat. For example, the prior art has contemplated the use of high velocity jets of liquid or water to separate meat or remove meat from bones. It has even been contemplated to employ frozen particles of water which are impinged against the bones to remove meat therefrom. However, in such products, is is generally contemplated that the ice must first be melted so that, whether ice or water is impinged upon the meat for separation or removal, it becomes necessary to separate the meat from water. Such a separation process is generally difficult, for example, since at least a portion of the meat or nutrients from the meat tend to become dissolved in the water and are particularly difficult to separate or recover.

Techniques such as those discussed above have been particularly discussed for removing meat from bones. However, it will be obvious that such techniques may also be employed to separate portions of the meat itself. For example, similar techniques could be employed with an original cut of meat in order to cut the meat, to separate all of the meat from the bones, and even to separate or reduce the meat into relatively small particles. In such a process the separated and removed meat would probably be further processed in order to produce a ground product.

Separated and/or removed meat which is obtained by such techniques is commonly employed in a number of products including for example, sausages, salami and various other processed meats.

In any such process, it is desirable to minimize processing of the meat in order to maintain its original quality and flavor. Accordingly, it is considered generally undesirable to mix the meat with water or other liquids which would require subsequent separation. Similarly, it is generally undesirable to rethaw the meat after it has once been frozen. In techniques such as those set forth above, it will be apparent that nutrients from the meat may be lost and/or the quality of the meat may be diminished by processes where the meat is first frozen and then rethawed.

Accordingly, there has been found to remain a need for method and apparatus for separating meat or for removing meat from bones wherein substantially all of the meat is recovered free from any portion of the bone and without diminishing the nutrient value or quality of the meat.

SUMMARY OF THE INVENTION

Accordingly, it is an object of the invention to provide a method and apparatus for separating or removing meat from bones wherein generally small frozen particles of meat are impinged at relatively high velocity upon the bones in order to separate or remove the meat from the bones. Preferably, a portion of the recovered meat is recycled to form the frozen particles.

The use of the meat itself in relatively small frozen particles which are employed to separate or remove it from the bone provides a number of particularly desirable advantages. Initially, there is no need for a separation step since all that is obtaned from the method and apparatus of the present invention is a combination of meat which is removed from the bone together with frozen recycled meat which is impinged upon the meat and/or bone. In addition, since there is no need for a separation step, it is also not necessary to thaw out the meat after it is frozen. In fact, the method and apparatus of the present invention may preferably be employed with the combination of recycled meat and newly separated or removed meat being immediately passed through a refrigeration step or apparatus so that all of the meat is frozen and maintained in that condition to retain maximum nutrient value and quality.

It is also an object of the invention to provide a method and apparatus for removing meat from bones in a continuous process where the bones including meat are continuously passed through an impingement region, the removal of meat being accomplished in the impingement region with a portion of the removed meat being formed as relatively small frozen particles which are returned to the impingement region. Within the continuous process, the bones may be allowed to exit from the impingement region after substantially all meat is removed therefrom.

It is another object of the invention to provide a method and apparatus wherein the bones containing meat to be removed are placed in a rotating drum structure having a mesh surface for retaining the bones and permitting separated or removed meat to pass through the mesh and be further processed. Preferably, the drum structure is rotated to maintain the meat in place upon its circumferential surfaces by centrifugal force while being impinged with the recycled frozen meat particles. Means, such as mechanical agitators or the like, are employed both to turn the bones so that all surfaces are exposed to the impinging particles in order to assure complete separation or removal of the meat while also gradually moving the bones through the impingement region formed within the drum. In this manner, it is possible for example to introduce bones containing meat at one end of the impingement region or drum with bones having all meat removed therefrom exiting from the opposite end of the impingement region or drum.

It is yet another object of the invention to provide a method and apparatus including a chamber where the bones are supported upon and agitated by an air column. The column serves to assure complete separation of the meat and/or removal of the meat from bones and at the same time to carry the separated or removed meat out of the impingement region for further processing. Here again, it is particularly contemplated that the meat separation or removal operation may be accomplished in either a batch or continuous process.

Additional objects and advantages of the invention are made apparent in the following description having reference to the accompanying drawings.

BRIEF DESCRIPTION OF THE DRAWINGS

FIG. 2 is a partly schematic representation of one embodiment of apparatus according to the present invention wherein bones containing meat are mechanically supported while having the meat removed therefrom according to the present invention.

FIG. 3 is a view taken along section lines III—III of FIG. 2.

DESCRIPTION OF THE PREFERRED EMBODIMENTS

Figure 1:
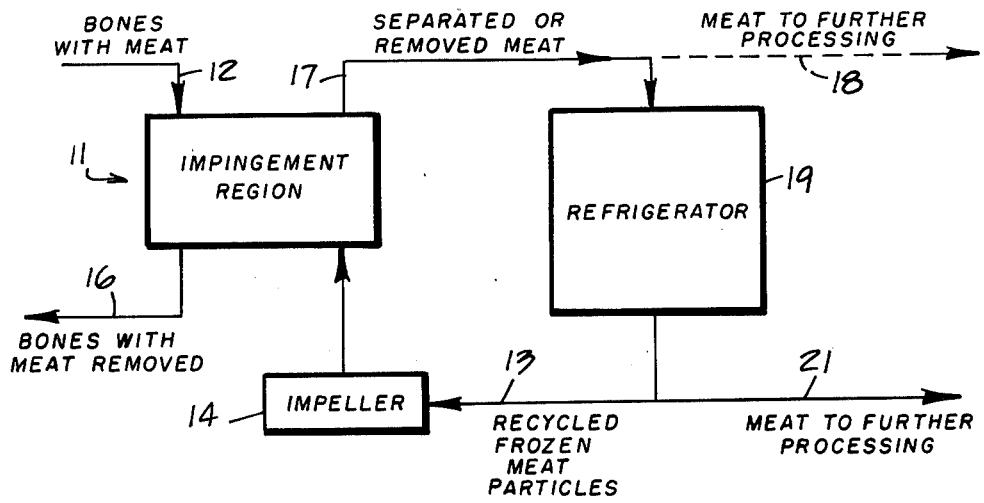
FIG. 1 is a schematic representation of the method and apparatus employed within the present invention for separating and/or removing meat.

The method and apparatus of the present invention is broadly illustrated by the schematic representation of FIG. 1 which illustrates the simplicity of the method and apparatus of the invention and emphasizes the manner in which the invention maintains the quality and nutrient value of the removed or separated meat.

Referring now to FIG. 1, the method and apparatus of the present invention essentially comprises an impingement region 11 wherein meat is separated and/or removed from bones by high velocity impingement of relatively small frozen particles of the meat itself.

Preferably, the small frozen particles of meat are a recycled portion of the meat obtained from the process. Accordingly, referring further to FIG. 1, bones having meat to be removed therefrom are introduced into the impingement region at 12 while frozen meat particles are provided at 13 to impeller means 14 which introduce the particles into the impingement region and cause them to be impinged at relatively high velocity upon the meat to be separated or the bones from which meat is to be removed.

After the meat is removed from the bones, the bones exit the impingement region at 16 and may be further processed as desired. In any event, the entire bone content is essentially removed at 16 and separated from all meat which exits the impingement region at 17. Thus, the meat obtained from the impingement region is of relatively high quality having maximum protein content and essentially no bone content. The meat recovered from the impingement region at 17 may be directly passed to further processing as indicated at 18.

A refrigerator means 19 is required at least to produce the frozen meat particles employed in the impingement region 11. As noted above, a separate source of meat particles could be refrigerated and introduced at 13 to the impingement region through the impeller means 14. However, it is preferable that a portion of the separated or removed meat indicated at 17 pass through the refrigerator means 19. All of the separated or removed meat 17 may thus immediately be frozen in order to maintain maximum quality and nutrient value. After being frozen in the refrigerator means 19, a substantial portion of the removed meat may be conveyed to further processing as indicated at 21 with a selected portion of the frozen meat being recycled as particles indicated at 13 in accordance with the preceding description.

Within the preferred embodiment of apparatus contemplated by the present invention, it will be apparent that various steps and/or functions of the apparatus and method described above with reference to FIG. 1 may be rearranged or performed in substantially different forms. However, it is to be noted that the method and apparatus of the invention essentially involves the use of frozen meat particles for separating or removing meat from bones in order to permit complete separation or removal of the meat and to maintain the quality of the meat during and after it is separated or removed.

It is particularly contemplated that meat separated from the bones within the impingement region 11 may be immediately frozen with apparatus of the type illustrated in U.S. patent application Ser. No. 688,599 filed on May 21, 1976 for "Refrigeration Apparatus for Viscous Paste Substance", now U.S. Pat. No. 4,098,095. The freezing apparatus disclosed therein is particularly adapted for freezing meat which is at a relatively higher temperature than the refrigerated surface of the rotating drum. That temperature differential is intended to assure that the meat adheres to the refrigerated surface of the drum. However, it is to be noted that the refrigerated drum of that patent may also be employed even with cooled or refrigerated meat from the impingement region of the present invention. In such an instance, a rotating blanket could be employed to maintain the meat in heat exchange contact with the refrigerated surface of the drum. In any event, the refrigerated drum of that reference would be particularly suited to rapid cooling or refrigeration of meat from the present process in order to better maintain its quality and nutrient value.

Referring now to FIGS. 2 and 3, apparatus is generally indicated at 110 which includes a rotatable drum 111 forming the impingement region of the invention in accordance with the preceding description of FIG. 1. Briefly, bones to have meat removed therefrom may be introduced into the drum assembly 111 at 112. Frozen meat particles indicated at 113 are introduced into an impeller means 114 which propels the particles into the impingement region formed by the drum for separating or removing meat from the bones. Bones having meat removed therefrom within the drum 111 are removed at 116 while separated or removed meat exits the drum 111 at 117.

Components arranged within the drum assembly 111 to facilitate the deboning operation of the present invention are described in greater detail below. However, it will be apparent that the frozen meat particles indicated at 113 may be supplied to the impeller 114 in generally the same manner described above with reference to FIG. 1. Preferably, the frozen meat particles indicated at 113 are a recycled portion of the particles exiting the drum at 117.

An inner drum 122 is nested within the drum 111 and supported upon bearing means indicated at 123 for rotation relative to the drum 111. In accordance with the following description, the drum 122 is generally cantilevered within the larger drum 111 to facilitate its operation as described in greater detail below. The drum 122 is formed with an open mesh generally indicated at 124 about its periphery. The mesh is sized in accordance with the following description of the method of the invention to retain bones within the drum 122 while permitting meat removed therefrom to pass outwardly through the open mesh 124. The inner drum 122 is connected with a corresponding tubular drive shaft 126 by webbing indicated at 127 so that the inner drum 122 is generally open at both ends.

An agitator drum 128 is arranged within the inner drum 122 and is formed generally as an open structure supporting a chevron arrangement of agitating blades 129 spaced about its periphery closely adjacent the cylindrical mesh portion 124 of the drum 122. The agitator drum 128 is also interconnected by means of open webbing 131 with a tubular drive shaft 132 which is nested within the tubular drive shaft 126 for the inner drum 122.

The drum 111 is supported upon bearings 133 and has a tubular drive shaft 134 arranged about the drive shaft 126. The nested drive shafts 126, 132, and 134 extend leftwardly for interconnection with suitable drive means 136. The drive means 136 may be a motor with suitable gearing (not otherwise shown) adapted to drive the respective drums 111, 122 and 128 at different speeds as described below.

As indicated above, bones having meat to be removed therefrom, as indicated at 112, are introduced into the inner drum 122 through an inlet 137. The inlet 137 is arranged so that the bones are deposited upon the inner periphery of the mesh portion 124.

At the same time, the frozen meat particles indicated at 113 are supplied to the impeller 114 which is in communication with a tubular shaft 138 extending through the axis of the drums and having a plurality of nozzles indicated at 139. During operation, the meat particles are driven by the impeller 114 through the shaft 138 so that they exit the nozzles 139 at relatively high speeds and impinge upon the meat and bones supported by the mesh portion 124 of the drum 122.

An end closure 141 for the drum 111 is fixed to the inlet 137 and forms an opening 142 through which the separated or removed meat 117 exits the drum. A stationary doctor blade 143 is supported by the closure 141 and extends in spiral configuration along the inner surface of the drum 111 to direct meat removed from the bones toward the opening 142. Finally, an opening 144 is formed at the left end of the outer drum 111 to permit exit of the bones 116.

In operation, the outer drum 111 is driven at a relatively low rate or rotation, for example, one revolution per minute (rpm). The outer drum is rotated for the purpose of allowing the doctor blade 143 to remove meat which passes through the mesh 124 onto the inner surface of the drum 111. The inner mesh drum 122 is driven at a higher speed of rotation, for example form 100 to 1000 rpm. The rate of rotation for the inner mesh drum 122 is selected to generally maintain the bones in place upon its inner surface under the influence of centrifugal force. This maintains the position of the bones so that they may be impinged by meat particles from the nozzles 139.

At the same time, the agitator drum 128 is driven at a slightly different speed relative to the inner mesh drum 122. For example, the agitator drum may be driven at 1000 plus or minus 5 rpm. The directions of rotation for the inner mesh drum 122 and the agitator drum 128 are selected to assure relative motion of the chevron blades 129 relative to the inner mesh drum 122 so that the frozen meat particles from the nozzles 139 impinge upon all surfaces of the bones.

At the same time, the chevron configuration of the blades 129 serves to shift the bones in a leftward direction, as viewed in FIG. 2. Accordingly, the bones having meat are introduced into the drum through the inlet 137. They are gradually moved leftwardly through the inner mesh drum 122 by action of the chevron blades 129. After the bones have been in the drum for a suitable time to permit complete removal of meat, the bones are passed leftwardly through the open webbing 131 and 127 of the two drums and exit through the opening 144. An annular wall 145 prevents the bones from becoming mixed with meat which is removed from the bones and passes outwardly through the mesh portion 124 of the inner drum 122.

While the bones are supported upon the inner surface of the mesh drum 122, the frozen meat partiles 113 are impinged thereupon to remove any remaining meat. The frozen particles tend to pass outwardly through the mesh 124 carrying along those meat particles removed from the bone. The frozen meat particles and removed meat are directed by the doctor blade 143 through the opening 142. Meat exiting the drum may be further processed as described above in relation to FIG. 1.

Within the method and apparatus described above with relation to FIGS. 2 and 3, it is apparent that the bones containing meat may be frozen or chilled when they are introduced into the drum 111. Refrigerated air may also be maintained within the drum 111 to maintain the chilled or frozen condition of the meat while it is within the drum.

Figure 4:
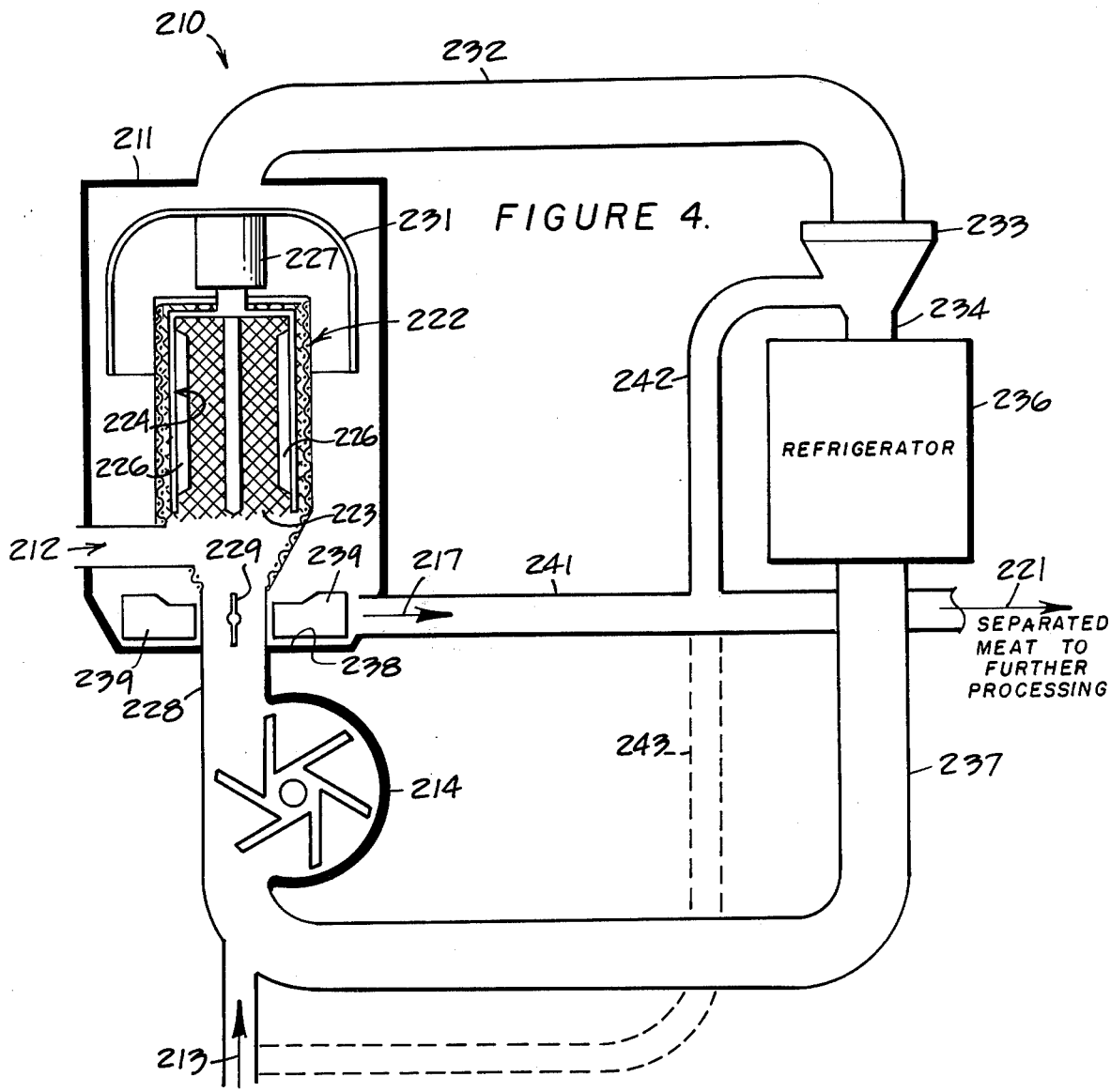
FIG. 4 is also a schematic representation, with parts in section, of another embodiment of apparatus according to the present invention wherein the bones to have meat removed therefrom are supported upon an air column during removal of the meat therefrom.

Yet another embodiment of the invention is illustrated in FIG. 4. Process apparatus indicated at 210 includes an impingement region formed by a cylindrical chamber 211. A smaller cylindrical chamber 222 is arranged within the chamber 211 and has its surfaces formed by open mesh as indicated at 222. An agitator assembly 224 is mounted within the mesh chamber 222 and includes scraper blades 226 disposed closely adjacent the mesh circumference of the chamber 222. The agitator assembly is driven in rotation by motor means 227 suspended above the chamber 222.

The lower end of the mesh chamber 222 is open and in communication with a duct 228 which penetrates the impingement drum 211. A butterfly valve indicated at 229 is arranged within the duct 228 in order to regulate communication between the interior of the mesh chamber 222 and the duct 228. A baffle or hood 231 extends above the mesh chamber 222 and extends downwardly thereabout to form a baffle for purposes described in greater detail below.

An outlet air duct 232 is in communication with the impingement drum 211 above the baffle 231. The duct 232 communicates with separation means such as the cyclone separator indicated at 233. The separator 233 recovers meat carried out of the chamber 211 by air in the duct 232. Air from the duct 232 and separator 233 is directed through another duct 234 to refrigerator means indicated at 236. The capacity of the refrigerator means is selected to maintain air or gas within the impingement chamber 211 at a low temperature, preferably at a temperature sufficiently low to freeze all meat separated or removed therein. This feature of the invention is described in greater detail below.

Frozen meat particles generally indicated at 213 are introduced into the impingement chamber 211 by an impeller means 214. Preferably, the impeller means 214 directs the frozen meat particles into the interior of the mesh chamber 222 through the duct 228. With this arrangement, the return duct 237 from the refrigerator 236 may also be connected with the impeller 214. Accordingly, the impeller 214 may perform the dual function of impelling the frozen meat particles into the smaller chamber 222 for removing meat from bones therein while also circulating air or gas through the impingement chamber 211, the duct 232, the separator 233, duct 234 and refrigerator means 236.

The volume of air or gas circulated through the impingement chamber 211 is selected to form an air column tending to support or suspend bones within the inner or smaller chamber 222. The bones thus tend to be agitated so that all surfaces of the bones are exposed to the frozen meat particles in order to permit complete removal of meat from the bones.

The agitator assembly 224 is driven in rotation during removal of meat from the bone so that the removed meat along with the frozen particles from the impeller 214 pass outwardly through the mesh surface 223 of the chamber 222. Thereafter, the major portion of the separated meat and meat particles falls to the floor 238 of the impingement chamber 211. Rotating paddle means 239 collect the separated meat and frozen meat particles and deliver them to an exit conduit 241.

Meat particles carried out of the impingement chamber 211 through the air duct 232 are recoved from the separator 233 and returned to the conduit 241 through a branch 242. Meat partilces from the conduit 242 may be passed to further processing in accordance with the preceeding description of FIG. 1. A portion of the processed meat may be returned to the impeller 214 as indicated at 213.

Alternatively, within the process of the present invention as carried within the apparatus of FIG. 4, it is also contemplated that meat removed from the bones within the smaller chamber 222 may be actually frozen within the impingement chamber 211 by air from the refrigerator means 236. Accordingly, all meat particles exiting the impingement chamber through the duct 241 would be frozen. It would thus be possible to select a portion of those particles, for example through a suitable sizing screen (not shown), for direct return to the impeller 214 for use within the chamber 222 for removal of meat from additional bones. An optional return conduit for this purpose is indicated at 243.

Within a method carried out in accordance with the embodiment of FIG. 4, it is particularly anticipated that the valve 229 would be closed while a fresh supply of bones containing meat are introduced into the smaller chamber 222 through the inlet 212. The valve 229 would then be opened to permit frozen meat particles to enter the smaller chamber 222 in accordance with the method described above. After complete removal of meat from the bones the valve 229 is again closed and the bones removed from the chamber through the same passage 212. However, it is also anticipated that the process conducted in the apparatus of FIG. 4 could be continuous in nature. For example, inlet and outlet passages (not otherwise shown) could be formed at opposite ends of the inner chamber 222 the rate of air flow through the impingement chamber being selected to permit the bones to pass along the length of the inner chamber in about the same time period required for complete removal of meat therefrom. Accordingly, the apparatus of FIG. 4 could also obviously be operated in a continuous cycle.

Particularly in connection with the embodiment of FIG. 4, it may be desirable to cut bones to a selected size before introducing them into the impingement region of the drum 211. Such sizing might be desirable or necessary in order to assure proper suspension of the bones by the air column from the duct 228. In both the embodiment of FIG. 4 and that of FIGS. 2 and 3 as well as the schematic representation of FIG. 1, it is contemplated that relatively small particles of frozen meat will best serve to remove meat from bones within the impingement retion. For example, the chips may be formed to size in the genral range of $\frac{1}{8}$ inch $\times \frac{1}{8}$ inch. However, the particular size of the meat particles as well as other parameters such as operating temperatures, rate and volume of air flow, rates of refrigeration and the like depend upon the particular configuration of the apparatus to be employed. Accordingly, the specific rates and size ranges quoted herein are only for purpose of example.

It will be apparent that numerous other modifications and variations are possible for the method and apparatus of the present invention in addition to those described above with reference to FIGS. 1–4. Accordingly, the scope of the present invention is defined only by the following appended claims.

What is claimed is:

1. In a method of removing meat from bones, the steps comprising arranging meat containing bones in an impingement region, impinging small frozen meat particles, at a relatively high velocity, against said meat containing bones while agitating said meat containing bones in order to separate the meat from the bones, said agitation exposing all surfaces of said meat containing bones to the impinging particles in order to assure complete removal of the meat from the bones, removing the impinged meat particles and the separated meat from the impingement region for further processing and supplying additional frozen particles of meat to an impeller for propelling them into the impingement region.

2. The method of claim 1 wherein a portion of the meat removed from the impingement region is recycled as small frozen particles for introduction into the impingement region.

3. The method of claim 1 further comprising the step of removing the bones from the impingement region after separation of meat therefrom.

4. The method of claim 3 wherein a portion of the meat removed from the impingement region is recycled as relatively small frozen particles for introduction into the impingement region.

5. The method of claim 4 wherein the impinged meat particles and the meat separated from the bones and removed from the impingement region are frozen and divided into small particles, a portion of said divided frozen particles being returned to the impingement region.

6. The method of claim 3 further comprising the step of introducing bones with meat to be removed therefrom into one end portion of said impingement region and removing said bones from another end portion of said impingement region after complete removal of meat therefrom.

7. The method of claim 3 further comprising the step of supporting the meat containing bones upon a mesh cylindrical surface of a drum, rotating said drum at a speed sufficient to centrifugally maintain the meat containing bones in position upon the circumferential surfaces of the drum and agitating the meat containing bones to move them along said mesh surface and to expose all surfaces of said meat containing bones to said impinging meat particles.

8. The method of claim 1 further comprising the step of circulating refrigerated gas through the impingement region in order to cool meat separated from bones therein.

9. The method of claim 8 wherein common impeller means are employed to circulate refrigerated gas through said impingement region and to impinge frozen meat particles upon bones within said impingement region.

10. The method of claim 8 wherein said gas circulated through said impingement region provides an air column for suspending bones within said impingement region in order to expose all surfaces of the bones to frozen meat particles being impinged thereupon.

* * * * *